June 24, 1924.

W. L. CASPER

ARTIFICIAL LINE

Filed Nov. 25, 1919

1,498,867

Inventor
William L. Casper
by J. E. Roberts Atty.

Patented June 24, 1924.

1,498,867

UNITED STATES PATENT OFFICE.

WILLIAM L. CASPER, OF BROOKLYN, NEW YORK, ASSIGNOR TO WESTERN ELECTRIC COMPANY, INCORPORATED, OF NEW YORK, N. Y., A CORPORATION OF NEW YORK.

ARTIFICIAL LINE.

Application filed November 25, 1919. Serial No. 340,530.

*To all whom it may concern:*

Be it known that I, WILLIAM L. CASPER, a citizen of the United States, residing at Brooklyn, in the county of Kings, State of New York, have invented certain new and useful Improvements in Artificial Lines, of which the following is a full, clear, concise, and exact description.

This invention relates to artificial networks for simulating the impedance characteristics of transmission lines.

As is well known in the art, it is frequently desirable to balance a transmission line by means of an artificial network in order to prevent the repeaters associated with the line from singing. Hoyt, in Patent No. 1,167,694 of January 11, 1916, has shown how the impedance of a uniform transmission circuit may be simulated by a network comprising in its simplest form a resistance and a capacity in series with each other and with the line to be balanced. It has been found, however, that the impedance of some transmission lines is so irregular with respect to various frequency values of the current, that such a network is not sufficient to give an accurate simulation of the line impedance especially at the lower frequencies in the range of importance in speech transmission.

In accordance with this invention it has been found that by employing in series with the line, a resistance shunted by a capacity or a capacity in shunt to an inductance and a resistance in series, that a more faithful simulation may be obtained in cases where the impedance of the transmission line is considerably different for certain frequencies than for higher or lower frequencies in the transmission range.

Figures 1, 2:
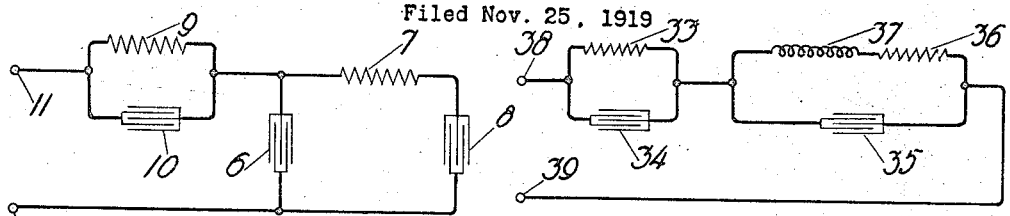
Figure 3:
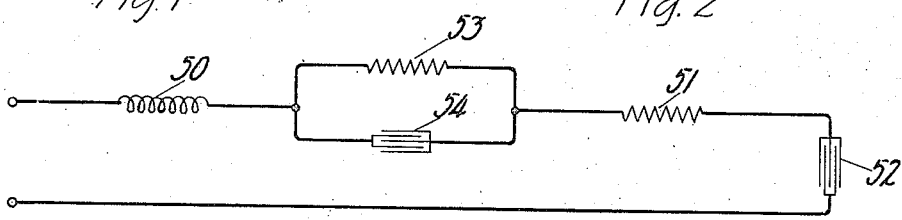
Figure 4:
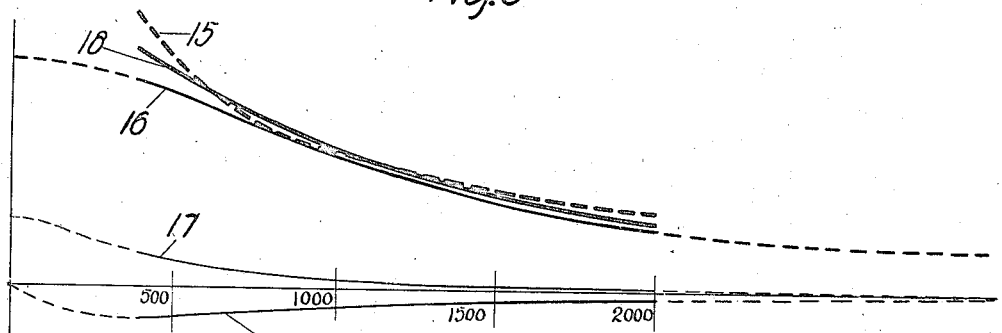
Figure 5:
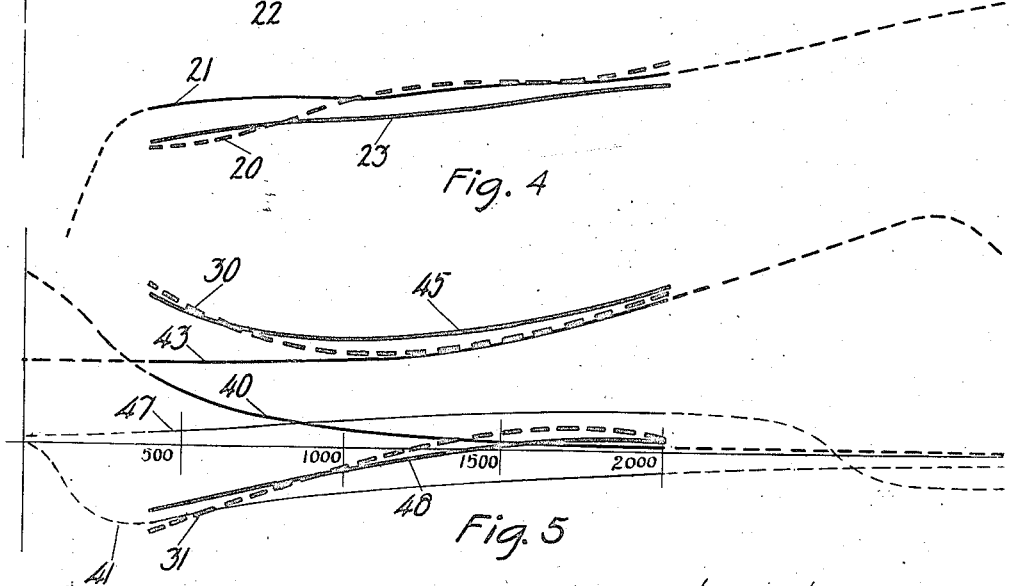

This invention will be better understood by reference to the following detailed description taken in connection with the accompanying drawings in which Fig. 1 represents an artificial line in which one portion comprises in series with the line, a resistance shunted by a capacity; Fig. 2 represents an artificial line one portion of which comprises in series with the line, a resistance shunted by a capacity, another portion of which comprises in series with the line a capacity shunted by a resistance in series with an inductance; Fig. 3 is a modification of Fig. 1; Fig. 4 illustrates the impedance curves that the artificial line, shown in Fig. 1, may have for certain values of its elements; while Fig. 5 illustrates the impedance curves that the artificial line shown in Fig. 2 may have.

The artificial line in Fig. 1 comprises two portions, one of which consists of a condenser 6, and a resistance 7 in series with condenser 8. This portion of the network is well known in the art and is disclosed in the above mentioned Hoyt patent. The second portion of the artificial line comprises in series with the line, a resistance 9 and a condenser 10. It is to be understood that the transmission line to be balanced may be connected to the terminals 11 and 12 of the artificial network. The function performed by portion 9 and 10 of the network in connection with the portion 6, 7, 8 in order to simulate the impedance characteristic of an actual line, will be better understood by reference to Fig. 4 wherein are shown the impedance characteristic of the network.

Referring to Figure 4, the ordinates of the various curves represent effective resistances and effective reactance of the elements in ohms, while the abscissæ represent various values of the frequency of the impressed current. The heavy line 15 is an example of the kind of characteristic curve the resistance component of an actual line may have which is to be balanced by such a network as shown in Fig. 1 for a frequency range for example, between 400 and 2,000 cycles. It was found by experiment that if resistance 7 be given a value of 870 ohms, and condensers 6 and 8 to be made to have capacities .17 microfarads and 1.17 microfarads respectively, the portions 6, 7, 8 of the network would have a resistance component characteristic such as that shown as curve 16 in Fig. 4. It will be seen, however, from the drawing, that the slope of curve 16 is not steep enough between the frequency range of from 500 to 1,000 cycles in order to correspond to the slope of curve 15. In accordance with this invention it has been found that the resistance component of the characteristic curve for the portion 9, 10 of the network of Fig. 1, may be of such a form as shown in curve 17 if resistance 9 has a value of 200 ohms and condenser 10 has a value of 2 microfarads. Curve 17, it will be noted, has a much steeper slope between the values 500 and 1000 cycles than it has for higher frequencies. The resultant curve formed by the combination of curves 16 and 17, is shown as curve 18 which simulates more accurately the resistance component of the impedance of the actual line, as shown by curve 15.

The reactance component of the impedance of the actual line corresponding to curve 15, is represented by line 20; the reactance component of the portion 6, 7, 8 of Fig. 1, is shown by curve 21; the reactance component of portion 9 and 10 is shown by curve 22; and the resultant of the reactance components of portions 6, 7, 8 and 9, 10 is shown by the solid black line 23. It will be noted that there is a more accurate simulation of line 20 by line 23 than there is by line 21.

The curve 30 of Fig. 5 illustrates another form that the resistance component of the impedance of the actual line may have, in which the resistance value is considerably higher at 500 cycles and 2.000 cycles than it is for intermediate frequencies. Curve 31 represents the reactance component of the impedance of such line. In order to balance an actual line having impedance characteristic curves such as 30 and 31 it is found preferable to employ such an artificial line as is shown in Fig. 2, where one portion comprises a resistance 33 shunted by a condenser 34, and another portion comprises a condenser 35 connected in shunt to a resistance 36 and an inductance 37 in series, both portions being in series with the actual line which may be connected in terminals 38 and 39. When the resistance 33 was given the value of 500 ohms and condenser 34 was made one microfarad, it was found that the resistance component of the impedance of the portion 33 and 34 was that shown by curve 40. The corresponding reactance characteristic curve for portion 33, 34 is shown as curve 41. It is to be noted that curve 40 is quite dissimilar to curve 30 and consequently could not be employed by itself in simulating the resistance component of the actual line represented by curve 30. It is found, however, that when inductance 37 was made 19.8 millihenrys, resistance 36 was made 240.3 ohms and condenser 35 was made .127 microfarads, that the resistance component of portion 35, 36, 37 was represented by curve 43 which it is noted, has a rising slope between 1500 and 2,000 cycles. The result of combining the portions 33, 34 and 35 and 36, 37 with the values above mentioned, gave a resistance characteristic curve as shown in curve 45. The reactance characteristic curve of portion 35, 36, 37 is shown as curve 47 and the resultant reactance characteristic curve for portions 33, 34 and 35, 36 37 is shown in curve 48.

Thus it will be seen that the network illustrated in Fig. 2 serves to simulate with close approximation, the impedance characteristic of an actual line of the general form shown in Fig 5.

The artificial network shown in Fig. 3 comprises an inductance 50, a resistance 41 and a condenser 52 in series with the actual line, and also comprises a portion which consists of resistance 53 shunted by a condenser 54. The artificial line of Fig. 3 is somewhat similar to that of Fig. 1 with the exception that capacity 6, which is shown in shunt to the line in Fig. 1 has been replaced by an inductance 50 in series with the line. The impedance curves for artificial lines shown in Fig. 3 will be similar to those shown in Fig. 4 except that the slope of the reactance curve between 500 and 2,000 cycles will not be so steep.

The actual values specified above for the various elements of the artificial networks have been given for illustration purposes only and are not intended in any wise to limit the scope of this invention. In general it may be said that, an actual line, the resistance component of which is represented by a curve of the form shown by curve 15 of Fig. 4, and the reactance component of which is represented by a curve such as curve 20 should be balanced by an artificial network of the general form shown in Fig. 1, although the values of the various elements may be varied somewhat to meet the requirements of each particular case. The artificial line shown in Fig. 2 should be employed to simulate actual lines, the resistance characteristic curve and the reactance charatercistic curve of which are of the general form shown in Fig. 5.

What is claimed is:

1. An artificial balancing line, comprising a network the impedance of which closely simulates that of an actual line throughout the major portion of the frequency range to be transmitted, and a second network for making the impedance of said artificial line more closely simulate that of the actual line at the lower end of said frequency range.

2. An artificial balancing line, comprising a network the impedance of which closely simulates that of an actual line throughout the major portion of the frequency range of importance in the transmission of speech, a second network for making the impedance of said artificial line more closely simulate that of the actual line at the lower end of said frequency range.

3. An artificial network for simulating an actual line, said network comprising two portions in series with each other and with said line, each of said portions comprising a plurality of parallel paths one of said paths in each of said portions consisting of a condenser and another of said paths in each of said portions comprising resistance.

4. An artificial network for simulating an actual line, said network comprising two portions in series with each other and with said line, one of said portions comprising a resistance and a condenser in parallel, and the other of said portions comprising a condenser in parallel with a path containing resistance.

5. An artificial network for simulating an actual line, said network comprising two portions in series with each other and with said line, one of said portions comprising a resistance and a condenser in parallel, and the other of said portions comprising a condenser in parallel with a path containing resistance and inductance.

6. An artificial network for simulating an actual line, said network comprising two portions in series with each other and with said line, one of said portions comprising a resistance and a condenser in parallel, and having an impedance which approximates that of the actual line, the other of said portions comprising a condenser in parallel with a path containing resistance and having an impedance supplementing the impedance of said first portion to give a more exact simulation of the line impedance.

7. An artificial network for simulating an actual line, said network comprising two portions in series with each other and with said line, one of said portions comprising a resistance and a condenser in parallel and having an impedance approximating that of the actual line throughout the major portion of the frequency range of improvement in the transmission of speech, the other of said portions comprising a condenser in parallel with a path containing resistance and having an impedance supplementing that of said first portion at the lower end of said frequency range to give a more exact simulation of the line impedance.

8. An artificial network for simulating the impedance characteristic of an actual line, the resistance component of which for the range of frequency of importance in speech is greater for lower frequencies of said range than for frequencies of intermediate values, one portion of said network comprising in series with said line a path the impedance of which is substantially entirely capacity reactance shunted by a path comprising a resistance element.

9. An artificial network for simulating the impedance characteristic of an actual line, the resistance component of which for the range of frequency of importance in speech is greater for lower frequencies of said range than for frequencies of intermediate values, one portion of said network comprising in series with said line a resistance in circuit with a capacity, another portion of said network comprising in series with said line a path the impedance of which is composed substantially entirely of capacity shunted by a path comprising a resistance.

10. An artificial network for simulating the impedance characteristic of an actual line, the resistance component of which for frequencies of the order of 500 cycles is much greater than for frequencies of the order of 1000 cycles, one portion of said network comprising a resistance and a capacity for simulating said resistance component for frequencies above the order of 1000 cycles, another portion of said network comprising in series with said line a resistance shunted by a capacity for simulating said resistance component for frequencies between a range of the order of 500 to 1000 cycles.

11. An artificial network for simulating the impedance characteristic of an actual line, one portion of said network comprising in series with said line a resistance in circuit with a capacity of such values as to approximately correspond to the characteristic curve of the resistance component of said line for frequencies of the order of 1000 to 2000 cycles, another portion of said network comprising in series with said line a path the impedance of which is composed substantially entirely of capacity shunted by a path comprising a resistance, said second-mentioned capacity and resistance having such values as to approximately correspond with the characteristic curve of the resistance component of said line for frequencies of the order of 400 to 1000 cycles.

12. An artificial network for simulating the impedance characteristic of an actual line, one portion of said network comprising a resistance and an inductance in series with each other and with said line, said resistance and said inductance having such values as to approximately correspond to the characteristic curve of the resistance component of said line for frequencies of the order of 1000 to 2000 cycles, another portion of said network comprising a path the impedance of which is composed substantially entirely of capacity shunted by a path comprising a resistance, said resistance and said second-mentioned capacity having such values as to correspond approximately to the characteristic curve of the resistance component of said line for frequencies of the order of 400 to 1000 cycles.

13. An artificial line for simulating the impedance characteristic of an actual line, one portion of said network comprising a path consisting of inductance and resistance only, shunted by a path consisting of capacity only, said inductance, resistance and capacity having such values as to approximately correspond to the characteristic curve of the resistance component of said line for frequencies of the order of 1000 to 2000 cycles, another portion of said network comprising a path consisting of resistance only shunted by a path consisting of capacity only, said second-mentioned capacity and resistance having such values as to approximately correspond to the characteristic curve of the resistance component of said line for frequencies of the order of 400 to 1000 cycles.

14. An artificial network for simulating the impedance characteristic of an actual line, the resistance component and the reactance component of which for the range of frequency of importance in speech are greater for lower frequencies of said range than for frequencies of intermediate values, one portion of said network comprising in series with said line a path the impedance of which is substantially entirely capacity reactance shunted by a path comprsing a resistance element.

15. An artificial network for simulating the impedance characteristic of an actual line, the resistance component and the reactance component of which for the range of frequency of importance in speech are greater for lower frequencies of said range than for frequencies of intermediate values, one portion of said network comprising in series with said line a resistance in circuit with a capacity, another portion of said network comprising in series with said line a path the impedance of which is composed substantially entirely of capacity shunted by a path comprising a resistance.

In witness whereof, I hereunto subscribe my name this 20th day of November A. D., 1919.

WILLIAM L. CASPER.